United States Patent
Gu et al.

(10) Patent No.: US 10,182,450 B2
(45) Date of Patent: *Jan. 15, 2019

(54) INTER-CELL INTERFERENCE MITIGATION

(71) Applicant: Telefonaktiebolaget LM Ericsson (publ), Stockholm (SE)

(72) Inventors: Xinyu Gu, Beijing (CN); Zhang Zhang, Beijing (CN); Jinhua Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,911

(22) Filed: Jun. 9, 2017

(65) Prior Publication Data
US 2017/0279576 A1 Sep. 28, 2017

Related U.S. Application Data

(63) Continuation of application No. 14/378,109, filed as application No. PCT/CN2012/071719 on Feb. 28, 2012, now Pat. No. 9,692,566.

(51) Int. Cl.
H04W 72/12 (2009.01)
H04J 11/00 (2006.01)
H04L 5/00 (2006.01)

(52) U.S. Cl.
CPC ..... *H04W 72/1231* (2013.01); *H04J 11/0056* (2013.01); *H04L 5/0035* (2013.01); *H04L 5/0073* (2013.01)

(58) Field of Classification Search
CPC ... H04L 5/0073; H04L 5/0032; H04L 1/0026; H04L 1/0027; H04W 72/082; H04W 52/243; H04W 72/1231
See application file for complete search history.

(56) References Cited

U.S. PATENT DOCUMENTS

| 9,692,566 B2 * | 6/2017 | Gu ..................... H04W 72/1231 |
| 2004/0109424 A1 * | 6/2004 | Chheda ............. H04W 72/1278 370/331 |

(Continued)

FOREIGN PATENT DOCUMENTS

| CN | 1998247 A | 7/2007 |
| CN | 101534560 A | 9/2009 |

(Continued)

OTHER PUBLICATIONS

PCT Notification Concerning Transmittal of International Report on Patentability (Chapter I of the Patent Cooperation Treaty) for International Application No. PCT/CN2012/071719 (dated Sep. 2, 2014).

(Continued)

*Primary Examiner* — Curtis Odom
(74) *Attorney, Agent, or Firm* — Baker Botts, LLP

(57) ABSTRACT

The present application discloses a method for mitigating inter-cell interference (ICI) by scheduling user equipments. The method comprises estimating inter-cell interference tolerance of each of at least one neighboring cell during uplink transmission of the user equipment; and coordinating uplink scheduling of the user equipment in accordance with the inter-cell interference tolerance. The present application also discloses a base station, a radio network controller and relevant signaling for mitigating inter-cell interference (ICI) by scheduling user equipments.

14 Claims, 4 Drawing Sheets

(56) References Cited

U.S. PATENT DOCUMENTS

| | | |
|---|---|---|
| 2007/0042784 A1 | 2/2007 | Anderson |
| 2007/0105561 A1 | 5/2007 | Doetsch et al. |
| 2008/0279121 A1* | 11/2008 | Englund .............. H04B 17/336 370/278 |
| 2009/0270109 A1 | 10/2009 | Wang |
| 2010/0027491 A1 | 2/2010 | Reina |
| 2010/0067454 A1* | 3/2010 | Lee ..................... H04W 52/322 370/329 |
| 2010/0151875 A1 | 6/2010 | Kim |
| 2011/0045831 A1* | 2/2011 | Chiu .................. H04W 72/082 455/436 |
| 2011/0103339 A1* | 5/2011 | Kim ...................... H04B 7/024 370/329 |
| 2011/0195731 A1 | 8/2011 | Jang |

FOREIGN PATENT DOCUMENTS

| | | |
|---|---|---|
| CN | 101933383 | 12/2010 |
| CN | 102017764 A | 4/2011 |
| EP | 1786228 | 5/2007 |
| EP | 1895795 | 3/2008 |
| WO | 2006/004968 | 1/2006 |
| WO | 2008/135101 | 11/2008 |

OTHER PUBLICATIONS

Notification of Transmittal of the International Search Report and the Written Opinion of the International Searching Authority, or the Declaration for International Application No. PCT/CN2012/071719 (dated Dec. 13, 2012).

EPO Extended Search Report for Application No. EP 12869716.6 (EP Publication 2820903) [PCT/CN2012/071719] (dated Mar. 19, 2015).

Harri Holma, Antti Toskala, "WCDMA for UMTS—Radio Access for Third Generation Mobile Communications", Third Edition (Section 8.2.2.1 "Uplink Load Factor" of the document) (Sep. 2004).

Notification of the First Office Action issued by the State Intellectual Property Office of the people's Republic of China for Application No. 201280070844.2—dated Jul. 20, 2017.

\* cited by examiner

INTER-CELL INTERFERENCE MITIGATION

PRIORITY

This application is a continuation, under 35U.S.C. § 120, of U.S. patent application Ser. No. 14/378,109which is a U.S. National Stage Filing under 35U.S.C. § 371of International Patent Application Serial No. PCT/CN 2012/071719, filed Feb. 28, 2012, and entitled "Inter-Cell Interference Mitigation" all of which are hereby incorporated by reference in their entirety.

TECHNICAL FIELD

The present disclosure relates to a cellular radio communication system, and more particularly, to a method, a base station and a radio network controller and relevant signaling for mitigating inter-cell interference (ICI) by scheduling user equipments.

BACKGROUND

In a cellular radio communication system, total received power received at a base station includes background noise of the base station and a sum of received power of all user equipments in serving and non-serving cells.

The user equipments contribute to the total received power and consume the radio resources. In other words, the user equipments introduce uplink interference which comes from both intra-cell interference and inter-cell interference. The inter-cell interference, which is caused by user equipments in neighboring cells, is becoming an important factor which impacts uplink performance.

A relative measure of the uplink interference is rise over thermal (ROT), i.e. a ratio of the uplink interference to the background noise of the base station. Tolerable ROT of a cell depends on the desired coverage of the cell. The smaller the coverage of the cell, the higher the tolerable ROT. Radio resources that can be allocated in the cell may be determined based on comparison of a measured ROT and the tolerable ROT. In a case that the measured ROT is much lower than the tolerable ROT, more radio resources can be allocated in the cell, and vice versa.

User equipments severed by a serving cell may introduce serious ICI in neighboring cells, in a case that the serving cell has a high tolerable ROT and the neighboring cells have a low tolerable ROT and in a case that the user equipment is close to the neighboring cells.

In the worst case, the ICI is so serious that the user equipments in the serving cell blocks the neighboring cells. Consequently, no user equipments can be served by the neighboring cells. However, the neighboring cells with the low tolerable ROT are normally the ones with a large serving area. Blocking the neighboring cells with the low tolerable ROT is unacceptable because it cause large coverage holes.

It is still desirable to mitigate the ICI in view of the difference in the tolerable ROT of the serving cell and the neighboring cells so as to balance the serving cell and the neighboring cells for ensuring cell coverage and user experience.

SUMMARY OF THE DISCLOSURE

It is an object of the present disclosure to overcome the above defect in the prior art.

According to one aspect of the present disclosure, there is provided a method for mitigating inter-cell interference in a cellular radio communication system, where a user equipment is served by a serving cell. The method comprises estimating inter-cell interference tolerance of each of at least one neighboring cell during uplink transmission of the user equipment; and coordinating uplink scheduling of the user equipment in accordance with the inter-cell interference tolerance.

Optionally, the uplink scheduling of the user equipment may be coordinated by adjusting scheduling grant of the user equipment.

Optionally, the inter-cell interference tolerance of each of the at least one neighboring cell may be estimated by receiving average link quality of the serving cell, average link quality and tolerable rise over thermal of each of the at least one neighboring cell; and determining the inter-cell interference tolerance of each of the at least one neighboring cell from the average link quality and the tolerable rise over thermal of the serving cell and the average link quality and the tolerable rise over thermal of each of the at least one neighboring cell.

Optionally, the average link quality of the serving cell may be derived from common pilot channel quality measurement of the user equipment for the serving cell, and the average link quality of each of the at least one neighboring cell is derived from common pilot channel quality measurement of the user equipment for each of the at least one neighboring cell.

Optionally, the uplink scheduling of the user equipment may be coordinated by estimating individual grant of the user equipment for each of the at least one neighboring cell; and determining the scheduling grant of the user equipment based on the individual grant of the user equipment for each of the at least one neighboring cell.

Optionally, the scheduling grant of the user equipment may be the minimum one among the individual grant of each of the user equipment for the at least one neighboring cell.

Optionally, the uplink scheduling of the user equipment may be coordinated by determining the scheduling grant of the user equipment based on the minimum one among the inter-cell interference tolerance of each of the at least one neighboring cell.

Optionally, the uplink scheduling of the user equipment may be coordinated by determining whether the user equipment is located at an edge area of the serving cell; and decreasing scheduling grant of the user equipment in a case that the user equipment is located at an edge area of the serving cell and tolerable rise over thermal of the serving cell is higher than tolerable rise over thermal of one of the at least one neighboring cell.

Optionally, whether the user equipment is located at the edge area of the serving cell is determined by a ratio of average link quality of the serving cell to average link quality of the one of the at least one neighboring cell.

Optionally, the cellular radio communication system may be a CDMA system.

According to another aspect of the present disclosure, there is provided a method for controlling radio communication among base stations of a cellular radio communication system, where a user equipment is served by a serving cell. The method comprises forwarding average link quality of the serving cell and each of at least one neighboring cell to a base station of the serving cell; and forwarding tolerable rise over thermal of each of the at least one neighboring cell to the base station of the serving cell.

According to another aspect of the present disclosure, there is provided a base station used in a cellular radio communication system, which covers a serving cell of a user equipment. The base station comprises a transceiver module for transmitting downlink data to the user equipment and for receiving uplink data from the user equipment over a carrier; a scheduler for scheduling downlink transmission and uplink transmission; and an interface unit for communicating with a radio network controller. The scheduler estimates inter-cell interference tolerance of each of at least one neighboring cell during the uplink transmission of the user equipment, and coordinates uplink scheduling of the user equipment in accordance with the inter-cell interference tolerance to mitigate the inter-cell interference.

Optionally, the scheduler may coordinate uplink scheduling of the user equipment by adjusting scheduling grant of the user equipment.

Optionally, the base station may have tolerable rise over thermal. The scheduler may receive average link quality of the serving cell, average link quality and tolerable rise over thermal of each of the at least one neighboring cell through the interface unit, and determine the inter-cell interference tolerance of each of the at least one neighboring cell from the average link quality and the tolerable rise over thermal of the serving cell and the average link quality and the tolerable rise over thermal of each of the at least one neighboring cell.

Optionally, the scheduler may estimate the individual grant of the user equipment for each of the at least one neighboring cell; and determine the scheduling grant based on the individual grant of the user equipment for each of the at least one neighboring cell.

Optionally, the scheduling grant of the user equipment may be the minimum one among the individual grant of the user equipment for the at least one neighboring cell.

Optionally, the scheduler may determine the scheduling grant of the user equipment based on the minimum inter-cell interference tolerance among the inter-cell interference tolerance of the at least one neighboring cell.

Optionally, the scheduler may determine whether the user equipment is located at an edge area of the serving cell; and decrease scheduling grant of the user equipment in a case that the user equipment is located at the edge area of the serving cell and tolerable rise over thermal of the serving cell is higher than tolerable rise over thermal of one of the at least one neighboring cell.

Optionally, the scheduler may determine whether the user equipment is located at the edge area of the serving cell by a ratio of average link quality of the serving cell to average link quality of the one of the at least one neighboring cell.

According to another aspect of the present disclosure, there is provided a radio network controller used in a cellular radio communication system, where a user equipment is served by a serving cell. The radio network controller comprises an interface unit through which the radio network controller forwards average link quality of the serving cell and each of at least one neighboring cell to a base station of the serving cell; and forwards tolerable rise over thermal of each of the at least one neighboring cell to the base station of the serving cell.

According to another aspect of the present disclosure, there is provided signaling for mitigating inter-cell interference in a cellular radio communication system, where a user equipment is served by a serving cell. The signaling comprises forwarding average link quality of the serving cell and each of the at least one neighboring cell from a radio network controller to a base station of the serving cell; and forwarding tolerable rise over thermal of each of the at least one neighboring cell from a radio network controller to the base station of the serving cell.

BRIEF DESCRIPTION OF THE DRAWINGS

The above and other objects, features and advantages will be more apparent from the following description of embodiments with reference to the attached drawings, in which.

DETAILED DESCRIPTION

The embodiments of the present disclosure will be detailed below with reference to the attached drawings. It should be noted that the following embodiments are illustrative only, rather than limiting the scope of the present disclosure.

In the preset disclosure, the term "rise over thermal" or "ROT" means a ratio of the uplink interference to the background noise of a base station; the term "average link quality" or "ALQ" means link quality measurement reported from one user equipment in a serving cell to a radio network work controller; and the term "scheduling grant" or "SG" means a message transmitted from a base station to a user equipment to inform the user equipment the maximum transport format that the user equipment can transmit with.

Figure 1:
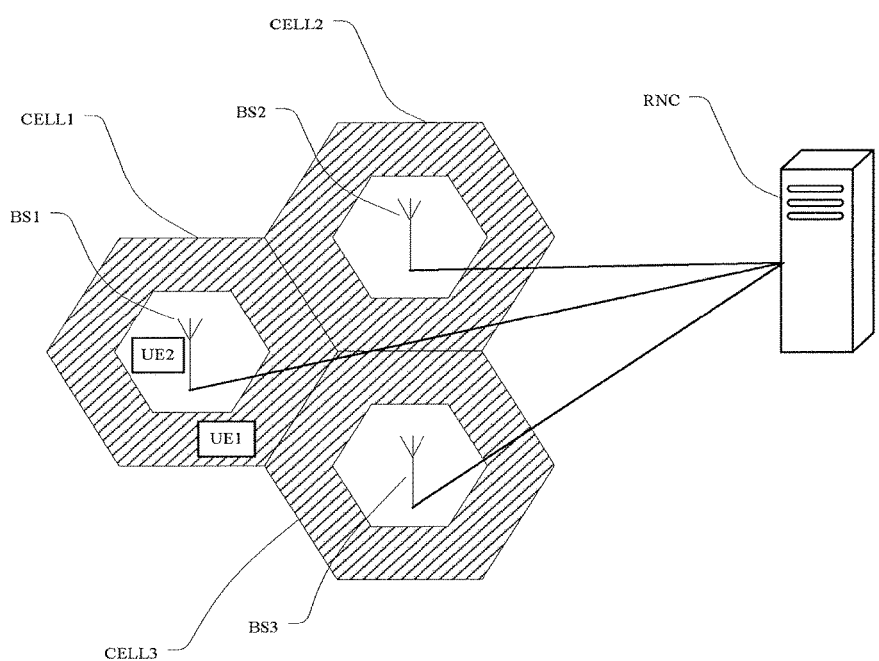
FIG. 1 is a block diagram illustrating a portion of a cellular radio communication system, which shows inter-cell interference caused by user equipments.

FIG. 1 is a block diagram illustrating a portion a cellular radio communication system, which shows inter-cell interference caused by user equipments. As shown in FIG. 1, each of base stations, BS1, BS2 or BS3, can serve user equipments in a given region or area known as a cell, i.e. CELL1, CELL2 or CELL3. For example, the base station BSI serves two user equipments UE1 and UE2 in the serving cell CELL1 with two neighboring cells CELL2 and CELL 3 in this example.

The base stations BS1, BS2 and BS3 are typically coupled with a radio network controller RNC. Typically, the radio network controller RNC configures each of the base stations BS1, BS2 and BS3 with tolerable rise over thermal. Each of the user equipments UE1 and UE2 detects average link quality of the serving cell CELL1 and the neighboring cells CELL2, CELL3 for the respective one user equipment, and then reports the detected average link quality to the radio network controller RNC via the base station BSI.

The radio network controller RNC forwards the average link quality of the serving cell and neighboring cells and the tolerable rise over thermal of the neighboring cells to the base station BSI of the serving cell CELL1. The base station BS1 coordinates uplink scheduling of the user equipments UE1, UE2 in the serving cell CELL1 to mitigate the ICI in the neighboring cells CELL2, CELL3.

The user equipment UE1 is located at an edge area (i.e. the area being diagonally hatched in the figure) of the serving cell CELL1. As will be discussed below, the ICI in the neighboring cells depends on locations of the user equipments in the serving cell. The closer the user equipment to the neighboring cells, the more serious the ICI in the neighboring cells. Thus, the user equipment UE1 will be allocated with radio resources less than the user equipment UE2 to reduce the ICI in the neighboring cells.

Three cells, including one serving cell and two neighboring cells, are discussed in this example. Alternatively, the cellular radio communication system may consist of less or more cells. Each serving cell may have one or more neighboring cells.

Further, in this example, no user equipments are shown in the two neighboring cells, so as to identify the serving cell from the neighboring cells. Alternatively, each of the two neighboring cells may serve their own user equipments. For example, when the cell CELL2 is a serving cell of other UEs, the cells CELL1, CELL3 are neighboring cells. The base stations BS2, BS3 also coordinate uplink scheduling of the user equipments in the cells CELL2, CELL3, respectively, in a way similar to the base station BS1.

Figure 2:
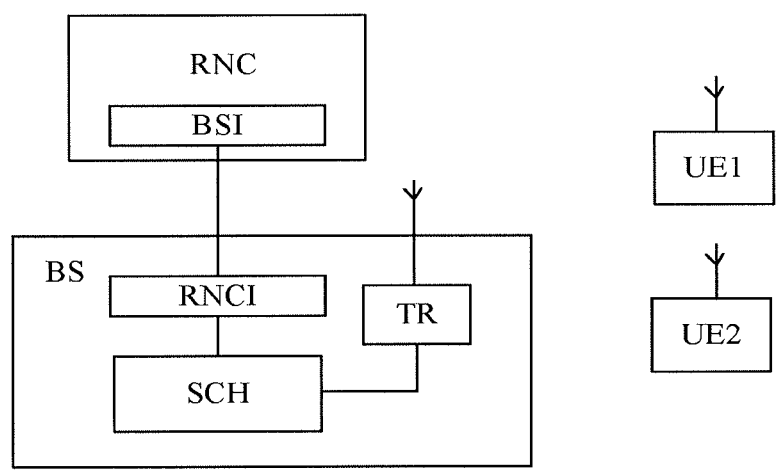
FIG. 2 is a block diagram illustrating an example of a base station in the cellular radio communication system in FIG. 1.

FIG. 2 is a block diagram illustrating an example of a base station in the cellular radio communication system in FIG. 1. The base station BS comprises a transceiver module TR, a scheduler SCH and an interface unit RNCI. The transceiver module transmits downlink data to user equipments UE1, UE2 and receives uplink data from the user equipments UE1, UE2 over a carrier. The scheduler SCH schedules downlink transmission and uplink transmission. The base station BS communicates with the radio network controller through the interface unit RNCI.

The main function of the base station BS is to perform the air interface L1 processing (channel coding and interleaving, rate adaptation, spreading, etc.). It also performs some basic radio resource management operations as inner loop power control and scheduling. The scheduler SCH in the base station BS determines which time instance a user equipment UE1, UE2 can transmit data and what is the maximum data rate that the user equipment UE1, UE2 is allowed to transmit with. Note that only the blocks in connection with scheduling are shown in FIG. 2 and other blocks are omitted, for the sake of clarity.

The radio network controller RNC comprises an interface unit BSI. The interface unit BSI of the radio network controller RNC is coupled with the interface unit RNCI of the base station BS and provides an interface, for example, an Iub Interface, between the base station BS and the radio network controller RNC. The radio network controller RNC forwards average link quality of the serving cell and each of at least one neighboring cell to the base station BS of the serving cell CELL1, and forwards tolerable rise over thermal of each of the at least one neighboring cell to the base station BS of the serving cell CELL1, through the interface.

Figure 3:
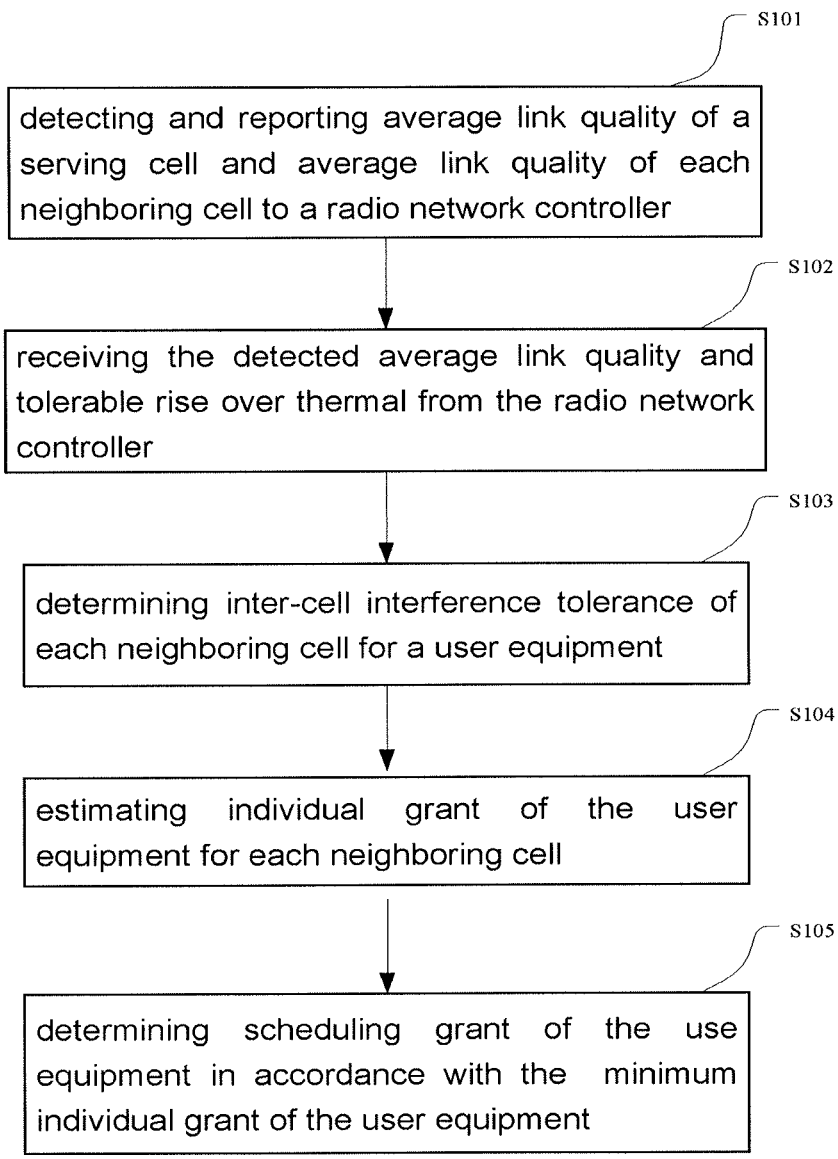
FIG. 3 is a flowchart illustrating a first embodiment of method steps.

FIG. 3 is a flowchart illustrating a first embodiment of method steps. The flow begins at step S101, at which step each of the user equipments UE1 and UE2 detects average link quality of the serving cell CELL1 and the neighboring cells CELL2, CELL3 for the respective one user equipment, and reports the detected average link quality to the radio network controller RNC via the base station BS1 (i.e. BS1 receive the detected average link quality from UE1 and UE2, and send it to the RNC).

At step S102, the base station BS1 of the serving cell CELL1 receives the detected average link quality of the serving cell CELL1 and each of the neighboring cells CELL2, CELL3 from the radio network controller RNC. As mentioned above, the radio station network controller RNC configures each of the base stations BS1, BS2 and BS3 with tolerable rise over thermal. The base station BS1 operates at known tolerable rise over thermal. Moreover, the base station BS1 receives the tolerable rise over thermal of each of the neighboring cells CELL2, CELL3 from the radio network controller RNC.

At step S103, the base station BS1 of the serving cell CELL1 determines ICI tolerance ICIT of one of the neighboring cells CELL2, CELL3 for one user equipment, by the following formula:

$$\text{ICIT}=f(\text{ALQ}_{serving}, \text{ALQ}_{neighboring}, \text{TROT}_{serving}, \text{TROT}_{neighboring}) \quad (1)$$

where $\text{ALQ}_{serving}$ and $\text{ALQ}_{neighboring}$ are the average link quality of one of the user equipments UE1, UE2 in the serving cell CELL1 and the one of the neighboring cells CELL2, CELL3, respectively; $\text{TROT}_{serving}$ and $\text{TROT}_{neighboring}$ are the tolerable rise over thermal of the serving cell CELL1 and the one of the neighboring cells CELL2, CELL3, respectively.

As an example of formula (1), the ICIT may be determined from a relative average link quality $\text{ALQ}_{rel}$ and a relative tolerable rise over thermal $\text{TROT}_{rel}$, by the following formula:

$$\text{ICIT}=f(\text{ALQ}_{rel}, \text{TROT}_{rel}) \quad (2)$$

where $\text{ALQ}_{rel}=\text{ALQ}_{neighboring}/\text{ALQ}_{serving}$, and $\text{TROT}_{rel}=\text{TROT}_{neighboring}/\text{TROT}_{serving}$.

As a further example of formula (2), the ICIT may be determined by the following formula:

$$\text{ICIT}=\min(\text{TROT}_{rel},1)*\max(\text{ALQ}_{rel}^{m}-\text{ALQ}_{th},0)+[1-\max(\text{ALQ}_{rel}^{m}-\text{ALQ}_{th},0)] \quad (3)$$

where m and $\text{ALQ}_{th}$ are system configuration parameters.

According to formula (3), the ICIT depends a location of the user equipment in the serving cell CELL1 with respect to the one of the neighboring cells CELL2, CELL3. The closer the user equipment to the concerned neighboring cell, the larger the relative average link quality $\text{ALQ}_{rel}$, and the more the ICIT is decreased by the relative tolerable rise over thermal $\text{TROT}_{rel}$. However, the user equipment at the central area of the serving cell, which satisfies $\text{ALQ}_{rel}^{m}<=\text{ALQ}_{th}$, will not adversely affect the ICIT of the neighboring cells. At step S104, the base station BS1 of the serving cell CELL1 estimates individual grant of the user equipment considering ICIT of each the neighboring cells by the following formula:

$$SG_i=SG_{prior}*\text{ICIT}_i, i=1,\ldots,n \quad (4)$$

where $SG_i$ is the estimated individual grant of the user equipment in view of the i-th neighboring cell; $SG_{prior}$ is scheduling grant determined according to prior art method, for example, known from H. Holma and A. Toskala, *WCDMA for UMTS—Radio Access for Third Generation Mobile Communications*, Chichester, U.K.: Wiley, 2004. $\text{ICIT}_i$ is the ICI tolerance of the i-th neighboring cell, for example, derived from formula (3); and n is the total number of the neighboring cells.

At step S105, the base station BS1 of the serving cell CELL1 determines the scheduling grant $SG_{cur}$ of the user equipment in view of all of the neighboring cells by taking the minimum one of the estimated individual grant of the user equipment as the scheduling grant, by the following formula:

$$SG_{cur}=\min(SG_1,\ldots,SG_n) \quad (5)$$

Figure 4:
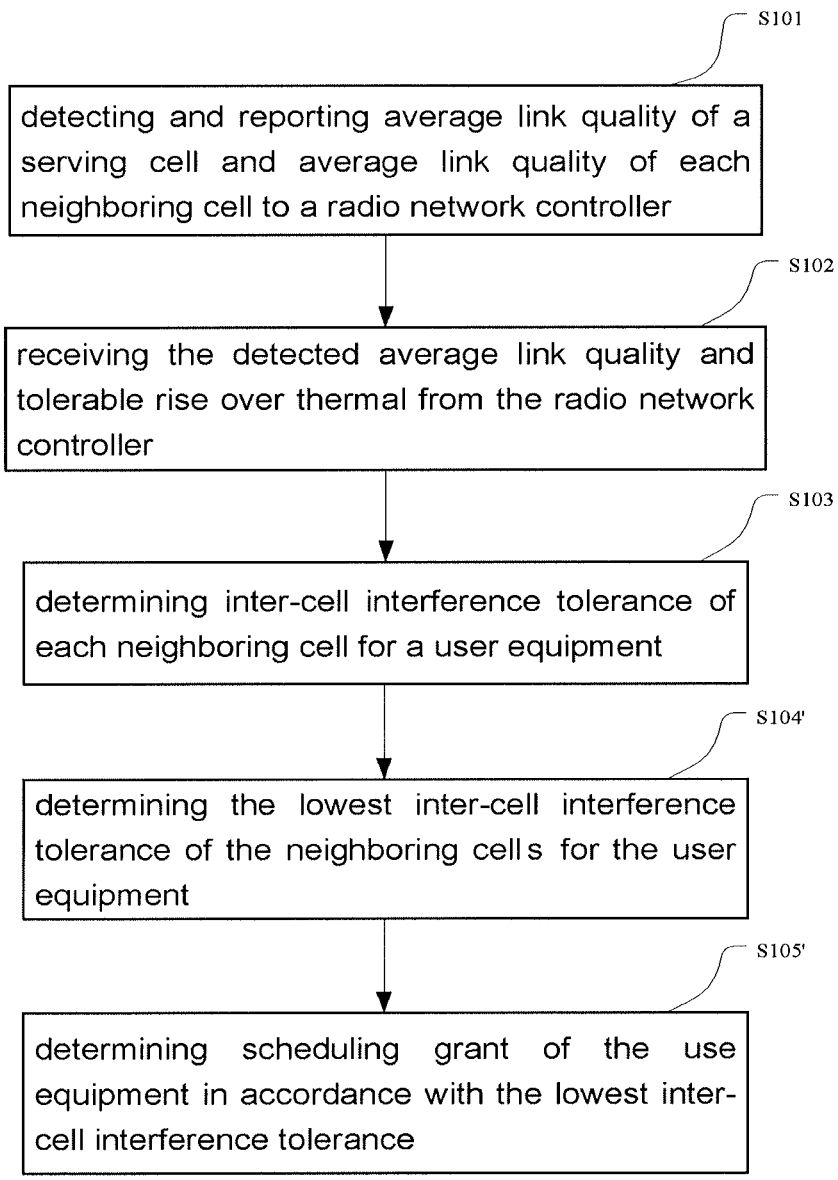
FIG. 4 is a flowchart illustrating a second embodiment of method steps.

FIG. 4 is a flowchart illustrating a second embodiment of method steps. Here, the same or equivalent steps as those already explained with reference to FIG. 3 are commonly labeled, and description of details is omitted for simplicity.

The second embodiment of method steps shown in FIG. 4 differs from the first embodiment of method steps shown in FIG. 3 in those steps following steps S101-S103.

At step S104', the base station BS1 of the serving cell CELL1 determines the lowest inter-cell interference tolerance $ICIT_{lowest}$ of the neighboring cells CELL2, CELL3 by the following formula:

$$ICIT_{lowest} = \min(ICIT_1, \ldots, ICIT_n) \quad (6)$$

where $ICIT_1$ is the ICI tolerance of the first neighboring cell; $ICIT_n$ is the ICI tolerance of the n-th neighboring cell; n is the total number of the neighboring cells.

At step S105', the base station BS1 of the serving cell CELL1 determines the scheduling grant $SG_{cur}$ of the user equipment in view of all of the neighboring cells by calculating the scheduling grant of the user equipment in accordance with the lowest inter-cell interference tolerance by the following formula:

$$SG_{cur} = SG_{prior} * ICIT_{lowest} \quad (7)$$

where $SG_{prior}$ is scheduling grant determined according to prior art method, for example, known from H. Holma and A. Toskala, *WCDMA for UMTS—Radio Access for Third Generation Mobile Communications*, Chichester, U.K.: Wiley, 2004.

In the first and second embodiments of method steps, the base station BS1 coordinates scheduling each of the user equipments in view of locations of the user equipments in the serving cell with respect to the neighboring cells, and the inter-cell interference tolerance of the neighboring cells. The user equipment UE1 at the edge area of the serving cell CELL1 typically introduces serious inter-cell interference in the neighboring cells.

For example, the base station BS1 may decrease scheduling grant of the user equipment UE1 at the edge area of the serving cell CELL1 with acknowledge of the configuration parameters of the neighboring cells CELL2, CELL3, while scheduling grant of the user equipment UE2 at the central area of the serving cell CELL1 may be unchanged. In this manner, the inter-cell interference in the neighboring cells with a low tolerable ROT is intentionally reduced by reasonably lowering the scheduling grant of the user equipment UE1. Meanwhile, the user equipment UE2 at the central area of the serving cell still has an unchanged scheduling grant to ensure excellent user experience.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

A glossary of the abbreviations used in this patent specification is set out below to facilitate an understanding of the present disclosure.

ICI inter-cell interference
ICIT inter-cell interference tolerance
ROT rise over thermal
TROT tolerable rise over thermal
ALQ average link quality
SG scheduling grant
BS base station
UE user equipment
RNC radio network controller
CELL cell
TR transceiver
SCH scheduler
RNCI interface unit of base station
BSI interface unit of radio network controller

What is claimed is:

1. A method for mitigating inter-cell interference in a base station of a cellular radio communication system, where a user equipment is served by a serving cell, comprising:
   estimating inter-cell interference tolerance of each of at least one neighboring cell during uplink transmission of the user equipment;
   coordinating uplink scheduling of the user equipment in accordance with the inter-cell interference tolerance;
   determining that the user equipment is located at an edge area of the serving cell; and
   decreasing a scheduling grant of the user equipment in response to determining that the user equipment is located at the edge area of the serving cell and tolerable rise over thermal of the serving cell is higher than tolerable rise over thermal of one of the at least one neighboring cell.

2. The method according to claim 1, wherein the uplink scheduling of the user equipment is coordinated by adjusting scheduling grant of the user equipment.

3. The method according to claim 2:
   wherein the base station has tolerable rise over thermal, and estimating the inter-cell interference tolerance of each of the at least one neighboring cell comprises:
   receiving average link quality of the serving cell, average link quality and tolerable rise over thermal of each of the at least one neighboring cell; and
   determining the inter-cell interference tolerance of each of the at least one neighboring cell from the average link quality and the tolerable rise over thermal of the serving cell and the average link quality and the tolerable rise over thermal of each of the at least one neighboring cell;
   wherein the average link quality of the serving cell is derived from common pilot channel quality measurement of the user equipment for the serving cell, and the average link quality of each of the at least one neighboring cell is derived from common pilot channel quality measurement of the user equipment for each of the at least one neighboring cell.

4. The method according to claim 2, wherein coordinating uplink scheduling of the user equipment comprises:
   estimating individual grant of the user equipment for each of the at least one neighboring cell; and
   determining the scheduling grant of the user equipment based on the individual grant of the user equipment for each of the at least one neighboring cell.

5. The method of claim 4, wherein the scheduling grant of the user equipment is the minimum one among the individual grant of the user equipment for each of the at least one neighboring cell.

6. The method according to claim 2, wherein coordinating uplink scheduling of the user equipment comprises:
   determining the scheduling grant of the user equipment based on the minimum one among the inter-cell interference tolerance of each of the at least one neighboring cell.

7. The method according to claim 1, wherein whether the user equipment is located at the edge area of the serving cell is determined by a ratio of average link quality of the serving cell to average link quality of the one of the at least one neighboring cell.

8. The method according to claim 1 wherein the cellular radio communication system is a CDMA system.

9. A base station used in a cellular radio communication system, which covers a serving cell of a user equipment, the base station comprising:
- a transceiver module for transmitting downlink data to the user equipment and for receiving uplink data from the user equipment over a carrier;
- a scheduler for scheduling downlink transmission and uplink transmission; and
- an interface unit for communicating with a radio network controller,
- wherein the scheduler estimates inter-cell interference tolerance of each of at least one neighboring cell during the uplink transmission of the user equipment; determines that the user equipment is located at an edge area of the serving cell; and decreases a scheduling grant of the user equipment in response to determining that the user equipment is located at the edge area of the serving cell and tolerable rise over thermal of the serving cell is higher than tolerable rise over thermal of one of the at least one neighboring cell.

10. The base station according to claim 9, wherein the scheduler coordinates uplink scheduling of the user equipment by adjusting scheduling grant of the user equipment.

11. The base station according to claim 10, wherein the scheduler estimates the individual grant of the user equipment for each of the at least one neighboring cell; and determines the scheduling grant based on the individual grant of the user equipment for each of the at least one neighboring cell.

12. The base station according to claim 11, wherein the scheduling grant of the user equipment is the minimum one among the individual grant of the user equipment for each of the at least one neighboring cell.

13. The base station according to claim 10, wherein the scheduler determines the scheduling grant of the user equipment based on the minimum inter-cell interference tolerance among the inter-cell interference tolerance of each of the at least one neighboring cell.

14. The base station according to claim 9, wherein the scheduler determines whether the user equipment is located at the edge area of the serving cell by a ratio of average link quality of the serving cell to average link quality of the one of the at least one neighboring cell.

* * * * *